(12) United States Patent
Gamm et al.

(10) Patent No.: US 6,867,530 B2
(45) Date of Patent: Mar. 15, 2005

(54) ELECTRICAL MACHINE

(75) Inventors: Oliver Gamm, Eislingen (DE); Falko Winter, Ludwigsburg (DE); Alexander Shendi, Asperg (DE); Hans-Peter Groeter, Vaihingen (DE); Jerome Debard, Cardiff (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,727

(22) PCT Filed: Dec. 18, 2001

(86) PCT No.: PCT/DE01/04738
§ 371 (c)(1), (2), (4) Date: Jan. 22, 2004

(87) PCT Pub. No.: WO02/065617
PCT Pub. Date: Aug. 22, 2002

(65) Prior Publication Data
US 2004/0119357 A1 Jun. 24, 2004

(30) Foreign Application Priority Data
Feb. 13, 2001 (DE) .......................... 101 06 519

(51) Int. Cl.[7] .............................................. H02K 21/12
(52) U.S. Cl. ....................................................... 310/263
(58) Field of Search ...................... 310/263; 29/596–598

(56) References Cited

U.S. PATENT DOCUMENTS

| 5,306,977 | A |   | 4/1994 | Hayashi |         |
|-----------|---|---|--------|---------|---------|
| 5,925,964 | A |   | 7/1999 | Kusase et al. | |
| 6,011,343 | A |   | 1/2000 | Taniguchi | |
| 6,020,669 | A | * | 2/2000 | Umeda et al. | 310/263 |
| 6,127,763 | A | * | 10/2000 | Nakamura et al. | 310/263 |
| 6,531,802 | B2 | * | 3/2003 | Umeda | 310/263 |
| 6,700,296 | B1 | * | 3/2004 | Oohashi et al. | 310/263 |
| 6,703,759 | B2 | * | 3/2004 | Oohashi et al. | 310/263 |

FOREIGN PATENT DOCUMENTS

| EP | 0 866 542 A2 | 9/1998 | |
| EP | 0 762 617 B1 | 3/1999 | 310/263 |
| EP | 1 065 776 A | 1/2001 | 310/263 |
| EP | 1 117 168 A2 | 7/2001 | |
| FR | 2 786 625 A | 6/2000 | 310/263 |
| FR | 2 793 085 A | 11/2000 | 310/263 |
| GB | 2 331 862 A | 6/1999 | |

* cited by examiner

*Primary Examiner*—Tran Nguyen
(74) *Attorney, Agent, or Firm*—Michael J. Striker

(57) ABSTRACT

Electrical machine, in particular an alternator for a motor vehicle, with a housing (4) and a rotor (10) that is supported, in the housing (4), in a manner that allows it to rotate around a rotation axis (12), the rotor having at least one rotor winding (14), a plurality of claw poles (17) disposed circumferentially, whereby adjacent claw poles (17) have axial claw overlap $L_{\ddot{U}}$ and permanent magnets (28) have axial magnet length $L_M$, whereby at least one permanent magnet (28) is located between every two adjacent claw poles (17) and is magnetized so as to suppress leakage flux between the claw poles (17), wherein the following applies for the ratio of axial magnet length $L_M$ to axial claw overlap $L_{\ddot{U}}$: $L_M/L_{\ddot{U}} \geq 0.81$.

8 Claims, 5 Drawing Sheets

US 6,867,530 B2

ELECTRICAL MACHINE

The present invention relates to an electrical machine, in particular for a motor vehicle, A claw-pole alternator is made known in European Patent 0 762 617 B1, in the case of which permanent magnets are located between adjacent claw poles to reduce leakage flux. When the ratio of the length of the magnets to the overlap of the claws is between 50% and 80%, the current increase by weight of the magnets should have a maximum. The reason for this is that the induction of the leakage field between the claws drops off precipitously when the indicated length is exceeded, so compensation for leakage field by permanent magnets is no longer necessary. This effect only occurs with claw poles having a relatively low height at the tip, however.

SUMMARY OF THE INVENTION

The invention is based on the object of creating an electrical machine, in particular an alternator, having improved output.

In keeping with these objects and with others which will become apparent hereinafter, one feature of the present invention resides, briefly stated in an electrical machine which has a housing, a rotor supported in said housing for rotation around a rotation axis, said rotor including at least one rotor winding, a plurality of claw poles disposed circumferentially so that adjacent ones of said claw poles have an axial claw overlap $L_U$, permanent magnets having axial magnet length $L_M$, whereby at least one of said permanent magnets is located between every two adjacent ones of said claw poles and is so magnetized that a leakage flux between said claw poles is suppressed, and a ratio of the axial magnet length $L_M$ to the axial claw overlap $L_U$ is $L_U$<0.81, said claw poles extending axially from a claw-pole root to a claw-pole tip, each of said claw poles having a height $H_W$ at the claw-pole root and a height $H_S$ at the claw-pole tip, and a ratio of the height $H_S$ at the claw-pole tip to the height $H_W$ at the claw-pole root is $H_S/H_W$ >0.25.

The essence of the invention is to fill the overlap region between adjacent claw poles as completely as possible with permanent magnet. According to further embodiments of the invention, it has proven advantageous to equip the claw poles with a minimum height at their tips.

BRIEF DESCRIPTION OF THE DRAWINGS

Additional features and details of the invention result from the description of an exemplary embodiment with reference to the drawing, whose figures show.

DETAILED DESCRIPTION OF THE PREFERRED EMBODIMENTS

Figure 1:
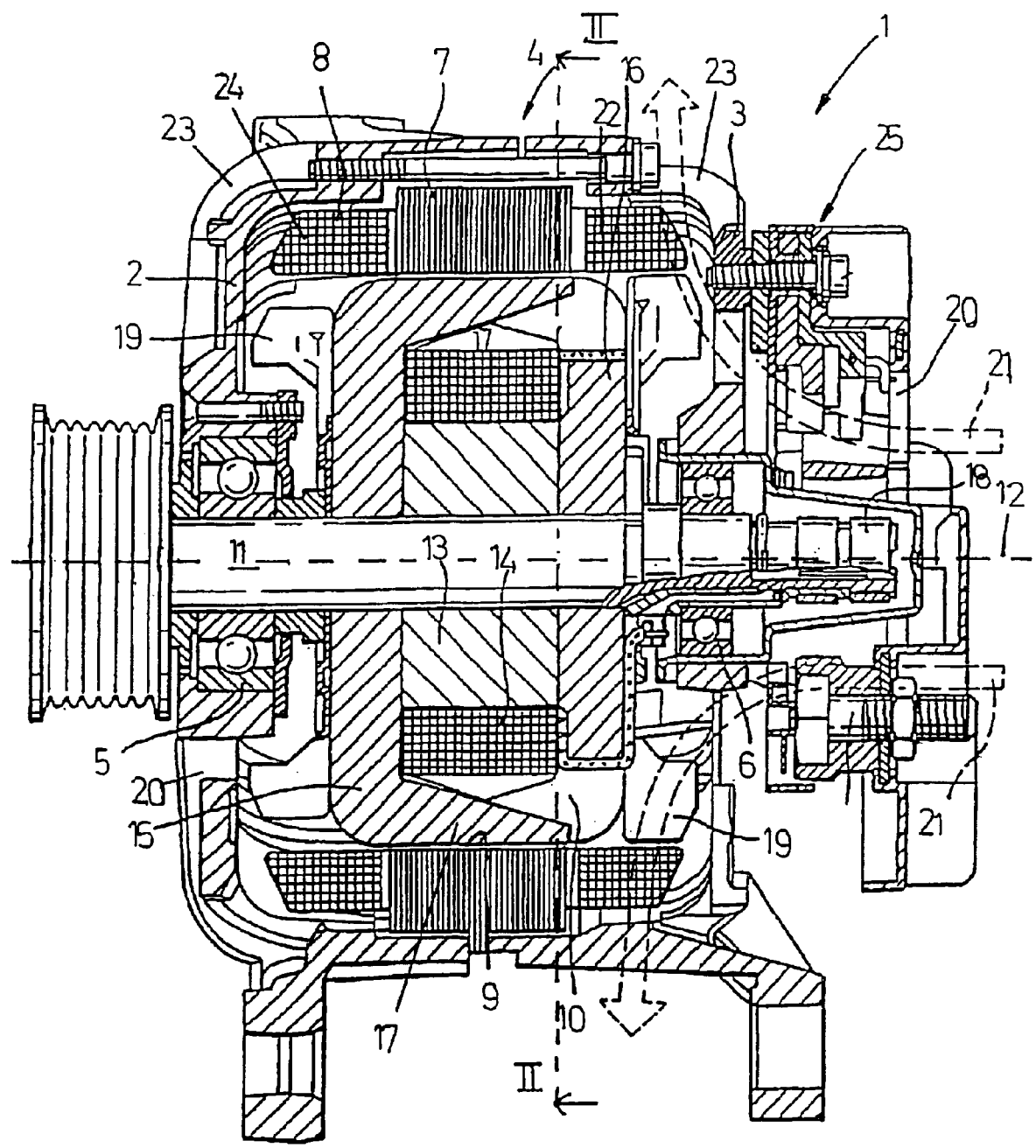
FIG. 1 a cross section of an alternator with a claw-pole rotor.

An alternator 1 developed as an electrical machine for motor vehicles has a die-cast housing 4 composed of two housing halves 2, 3. Housing half 2 is configured as an end shield for a drive bearing 5. Housing half 3 is configured as an end shield for a roller bearing 6. A stator lamination 7 is fixed in position centrally in the housing 4, and accommodates a three-phase stator winding 8 in known fashion for generating an alternating current. Stator lamination 7 has a centrally located stator bore 9 in which a claw-pole rotor 10 with a rotor shaft 11 is located, whereby the latter is supported in bearings 5 and 6 in a manner that allows it to rotate around a rotation axis 12. Mounted in the central region of rotor shaft 11 is a magnetically conductive annular core 13 on which an excitation winding 14 configured as rotor winding is located. Claw-pole plates 15 and 16 are mounted on rotor shaft 11 in the axial direction in front of and behind the annular core 13, the finger-shaped claw poles 17 of which intermesh at a distance from one another to form an alternating field.

A collector-ring arrangement 18 is provided on the right end—as shown in FIG. 1—of rotor shaft 11 to supply current to excitation winding 14. One collector ring each of the collector-ring arrangement is electrically connected with one end of excitation winding 14. The collector rings interact in known fashion with a notshown carbon brush device in which a voltage regulator is integrated, with which the direct current flowing in the excitation winding 14 is regulated in accordance with the demand in the electrical system of the motor vehicle. A fan wheel 19 is mounted on each of the outer end faces of claw-pole plates 15 and 16, that draws in a cooling air stream 21 axially through slits 20 in the housing half and blows it radially past the rear winding head 22 of stator winding 8 toward the outside through radial slits 23. Fan wheel 19 located on the left—as seen in FIG. 1—end face of claw-pole plate 15 draws in a cooling air stream axially through slits 20 in housing half 2 and blows it past the front winding head 24 of stator winding 8 toward the outside through slits 23 located on the outside. In cooling air stream 21 that is drawn in axially by fan wheel 19 on the right—as seen in FIG. 1—a rectifier assembly 25 is located on the outer end face of rear housing half 3, the rectifier assembly being connected on the input side with the winding outputs of stator winding 8 to rectify, in known fashion, the alternating current induced there. The direct current required to supply power to the vehicle electrical system is picked off in known fashion at the output of rectifier assembly 25.

Figure 2:
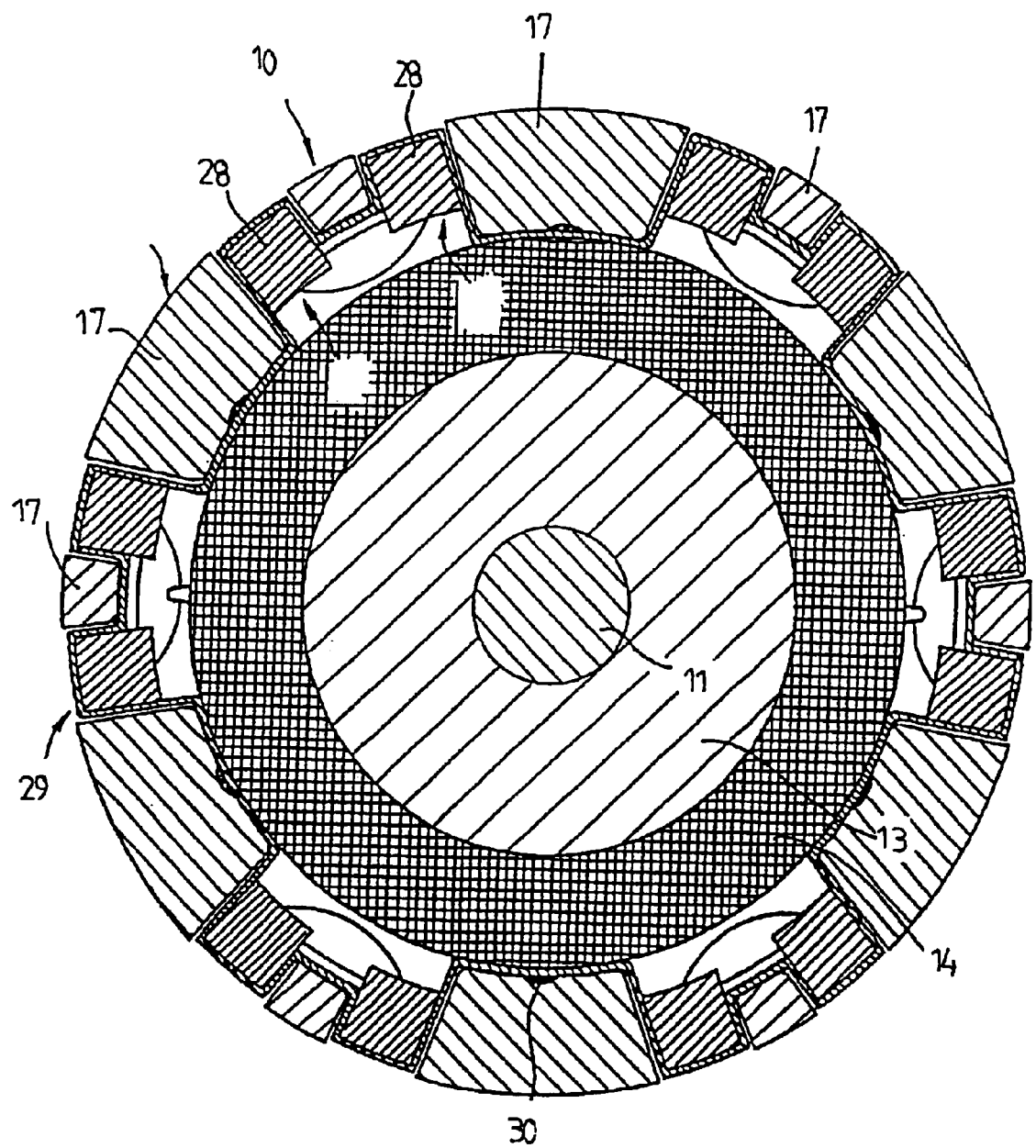
FIG. 2 a cross section along the line of cut II—II in FIG. 1.
Figure 3:
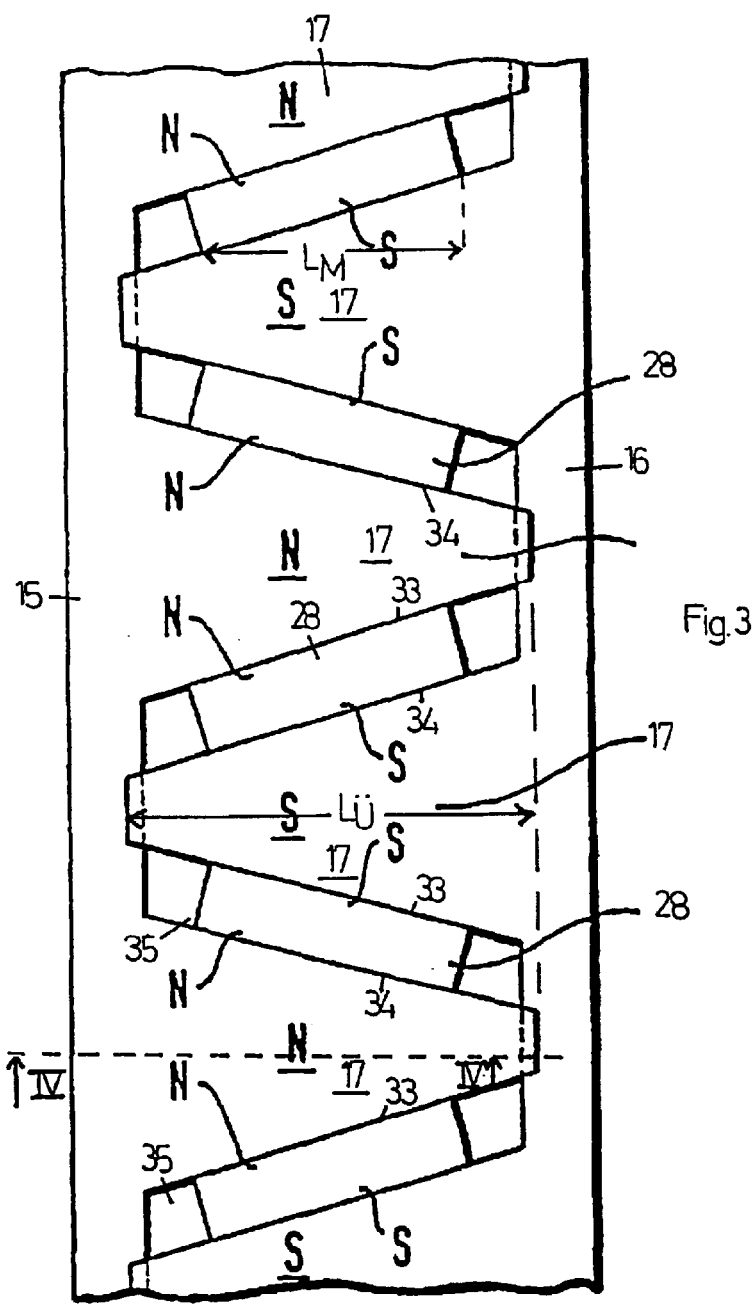
FIG. 3 a top view of the claw-pole rotor.
Figure 4:
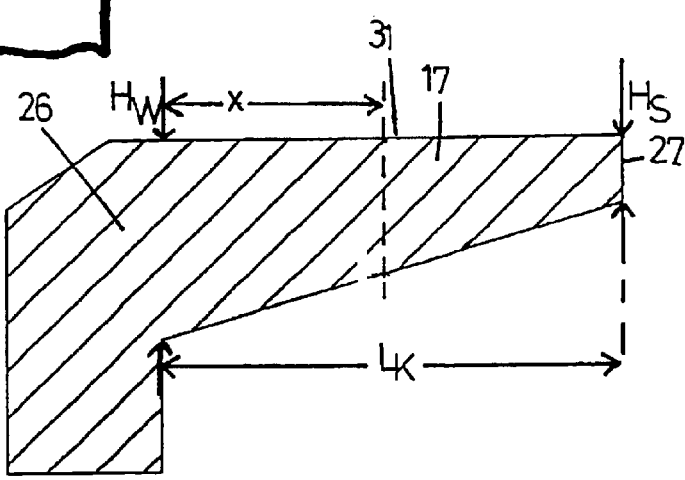
FIG. 4 a cross section along the line of cut IV—IV in FIG. 3.

The design of claw-pole rotor 10 will be described hereinbelow with reference to FIGS. 2 through 4. Claw poles 17 of claw-pole plate 15 extend from a claw-pole root 26 in the axial direction toward a claw-pole tip 27 in the direction toward claw-pole plate 16. Claw poles 17 joined with claw-pole plate 16 extend in the reverse direction and intermesh alternatingly with the other claw poles 17 in finger-like fashion. A rectangularly-configured permanent magnet 28 is located between every two adjacent claw poles 17. Permanent magnets 28 are held next to claw poles 17 using, for example, a substantially meander-like retaining sleeve 29 that extends, in the region of claw poles 17, below the particular claw pole 17 and, in the region of permanent magnets 28, above the particular permanent magnet 28. Retaining sleeve 29 is joined with claw poles 17 via welding points 30. The more exact configuration of retaining sleeve 29 for permanent magnets 28 is made known in DE 198 02 784 A1, to which reference is made here. Retaining sleeve 29 supports permanent magnets 28 against centrifugal forces.

Individual claw poles 17 have a top side 31 and an underside 32 that extends upward at an angle from root 26 to tip 27. Claw pole 17 has height $H_W$ at the root. The height is $H_S$ at the tip. Claw pole 17 has length $L_K$ from root 26 to tip 27. Claw pole 17 has two side walls 33 and 34 that converge symmetrically on one another. At the root, claw pole 17 has cross-sectional area $F_W$ perpendicular to rotation axis 12. The cross-sectional area at tip 27 is $F_S$. Permanent magnets 28 have axial length $L_M$. Adjacent claw poles 17 have axial claw overlap $L_{\ddot{U}}$ as measured from tip 27 of one claw pole 17 to tip 27 of the other claw pole 17. The following applies for the ratio of magnet length $L_M$ to claw overlap $L_{\ddot{U}}$: $L_M/L_{\ddot{U}} \geq 0.81$, in particular $0.81 \leq L_M/L_{\ddot{U}} \leq 1.1$ and, particularly advantageously, $0.9 \leq L_M/L_{\ddot{U}} \leq 1.0$. The following applies for the ratio of cross-sectional areas $F_S$ and $F_W$: $F_S/F_W \geq 0.04$ and, in particular, $F_S/F_W \geq 0.08$. The following applies for the ratio of heights $H_S$ and $H_W$: $H_S/H_W \geq 0.25$ and, in particular, $H_S/H_W \geq 0.3$. The following applies in a particularly advantageous embodiment: $H_S \geq 4$ mm and, in particular, 7 mm. The space between side wall 33 of a claw pole 17 and side wall 34 of an adjacent claw pole 17 is referred to as overlap space 35. Permanent magnets 28 are situated approximately axially centrally in overlap space 35. The polarity of magnets 28 is selected such that it corresponds to the polarity of adjacent claw pole 17 in the state when it is excited by excitation winding 14. If one claw pole 17 is poled as the south magnetic pole, for example, the two magnets 28 adjacent to it each face this claw pole 17 with the south pole side. Magnets 28 suppress the magnetic leakage flux through claw poles 17 and, in fact, they generate a magnetic flux.

Figure 5:
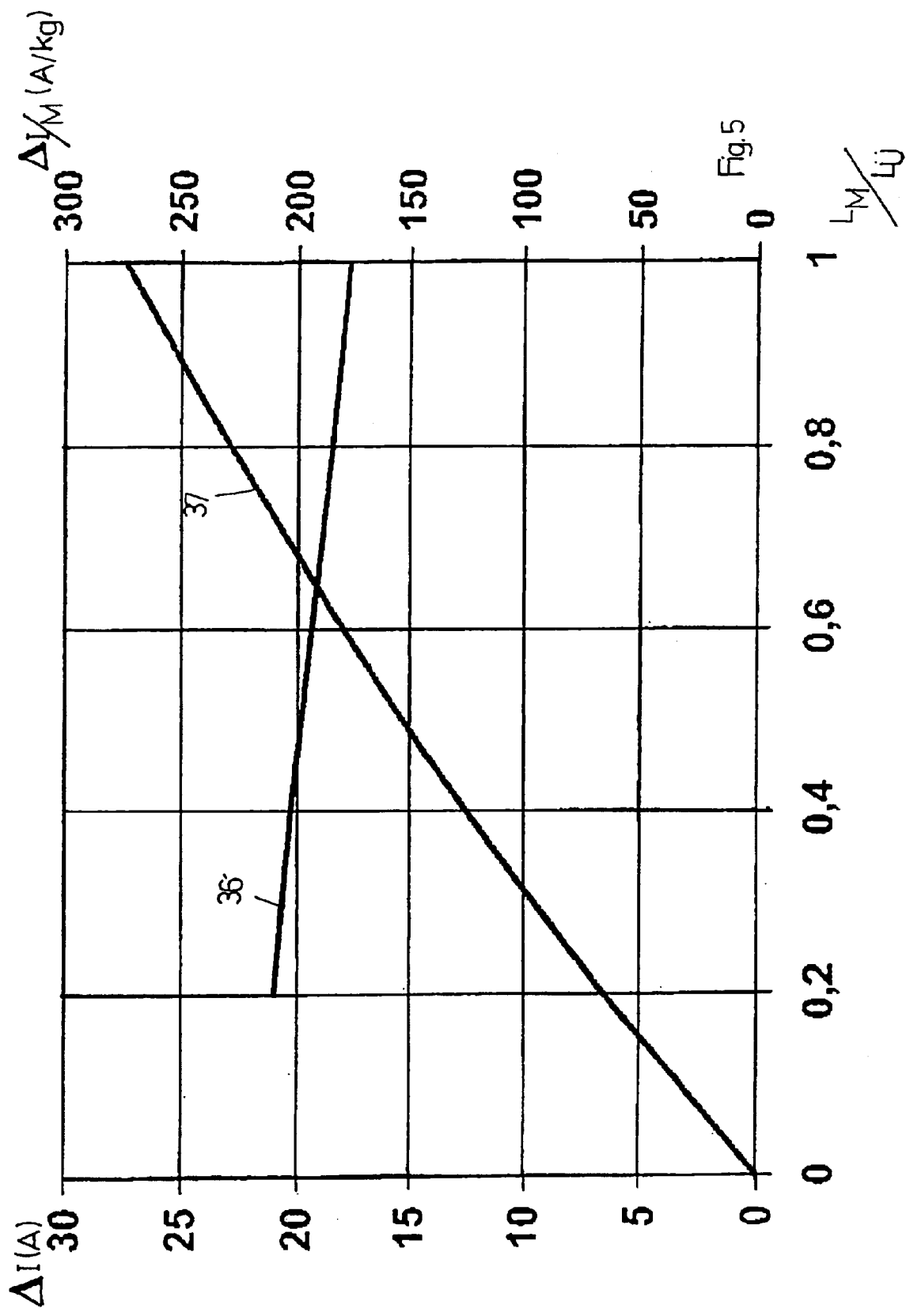
FIG. 5 a diagram with the trace of the increase in alternator current and the increase in alternator current per magnet mass, plotted against the normalized magnet length, and FIG. 6 a diagram that shows the normalized cross-sectional area of a claw pole according to the invention, at various points.
Figure 6:
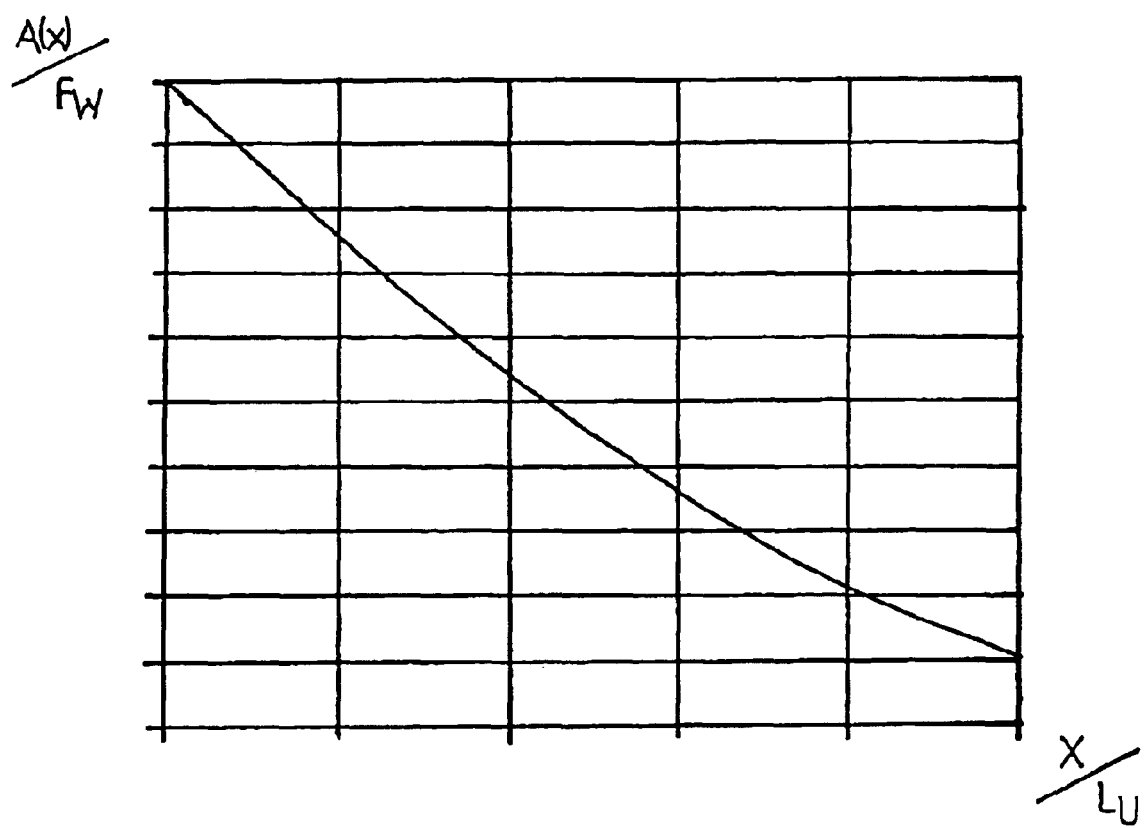

The function of alternator 11 will be described hereinbelow. The general operating principle of an alternating-current generator of the type described has been known for some time. By the—in particular—complete filling of overlap space 35 with a magnet 28, that is, $L_M/L_{\ddot{U}} \leq 0.81$, a further increase in the output of the alternator can be achieved via additional leakage field compensation. In FIG. 5, two characteristic curves 36 and 37 are plotted against normalized magnet length $L_M/L_{\ddot{U}}$. Characteristic curve 37 shows the increase in alternator current $\Delta I$. It is obvious that alternator current increases steadily as the filling of overlap space 35 with a magnet 28 increases. Characteristic curve 36 represents the increase in alternator current $\Delta I$ per total mass M of magnets 28. It is obvious that $\Delta I/M$ drops steadily. The essential point, however, is that the increase in alternator current continues to increase although the increase in alternator current per magnet mass decreases. It is reasonable, therefore, to fill overlap space 35 as completely as possible. Characteristic curves 36, 37 apply under the premise that the ratios indicated hereinabove apply for cross-sectional areas $F_S$ and $F_W$ and heights $H_S$ and $H_W$. The dimensions of claw pole 17 are shown more exactly using a characteristic curve in FIG. 6. A certain cross-sectional region of claw pole 17 at distance X from root 26, normalized with claw overlap $L_{\ddot{U}}$, is plotted on the x-axis. Cross-sectional area A(X) of claw pole 17 at a distance X from root 26, normalized with area $F_W$, is plotted on the y-axis. It is obvious that the cross-sectional area decreases as the distance X from root 26 increases. The decrease is slower, however, than with claw poles described in the related art. This means that the characteristic curve shown in FIG. 6 is located above the characteristic curves of other claw poles described in the related art.

It is therefore possible to increase the output of alternator 1 by filling overlap space 35 more completely while simultaneously ensuring that tips 27 are sufficiently high.

What is claimed is:

1. An electrical machine formed as an alternator for a motor vehicle, comprising a housing; a rotor supported in said housing for rotation around a rotation axis, said rotor including at least one rotor winding, a plurality of claw poles disposed circumferentially so that adjacent ones of said claw poles have an axial claw overlap $L_{\ddot{U}}$, permanent magnets having axial magnet length $L_M$, wherein at least one of said permanent magnets is located between every two adjacent ones of said claw poles and is so magnetized that a leakage flux between said claw poles is suppressed, and a ratio of the axial magnet length $L_M$ to the axial claw overlap $L_{\ddot{U}}$ is $L_M/L_{\ddot{U}} \geq 0.81$, said claw poles extending axially from a claw-pole root to a claw-pole tip, each of said claw poles having a height $H_W$ at the a claw-pole root and a height $H_S$ at the claw-pole tip, and a ratio of the height $H_S$ at the claw-pole tip to the height $H_W$ at the claw-pole root is $H_S/H_W \geq 0.25$.

2. An electrical machine as defined in claim 1, wherein the ratio of the height $H_S$ at the claw-pole tip to the height $H_W$ at the claw-pole root is $H_S/H_W \geq 0.3$.

3. An electrical machine as defined in claim 1, wherein the ratio of the magnetic length $L_M$ to the claw overlap $L_{\ddot{U}}$ is $0.81 \leq L_M/L_{\ddot{U}} \leq 1.1$.

4. An electrical machine as defined in claim 1, wherein one of said claw poles has a cross-sectional area $F_W$ at the claw pole root and a cross-sectional area $F_S$ at the claw pole tip.

5. An electrical machine as defined in claim 4, wherein a ratio of the cross-section area $F_S$ at the claw-pole tip to the cross-sectional area $F_W$ at the claw-pole root is $F_S/F_W \geq 0.04$.

6. An electrical machine as defined in claim 1, wherein a ratio of the cross-section area $F_W$ at the claw-pole tip to the cross-sectional area $F_W$ at the claw-pole root is $F_S/F_W \geq 0.08$.

7. An electrical machine as defined in claim 1, wherein the height of the claw-pole tip is $H_S \geq 4$ mm.

8. An electrical machine as defined in claim 1, wherein the height of the claw-pole tip is $H_S \geq 7$ mm.

* * * * *